G. C. BEIDLER.
PHOTOGRAPHIC PRINTING APPARATUS.
APPLICATION FILED APR. 10, 1917.
1,340,209.
Patented May 18, 1920.
2 SHEETS—SHEET 1.
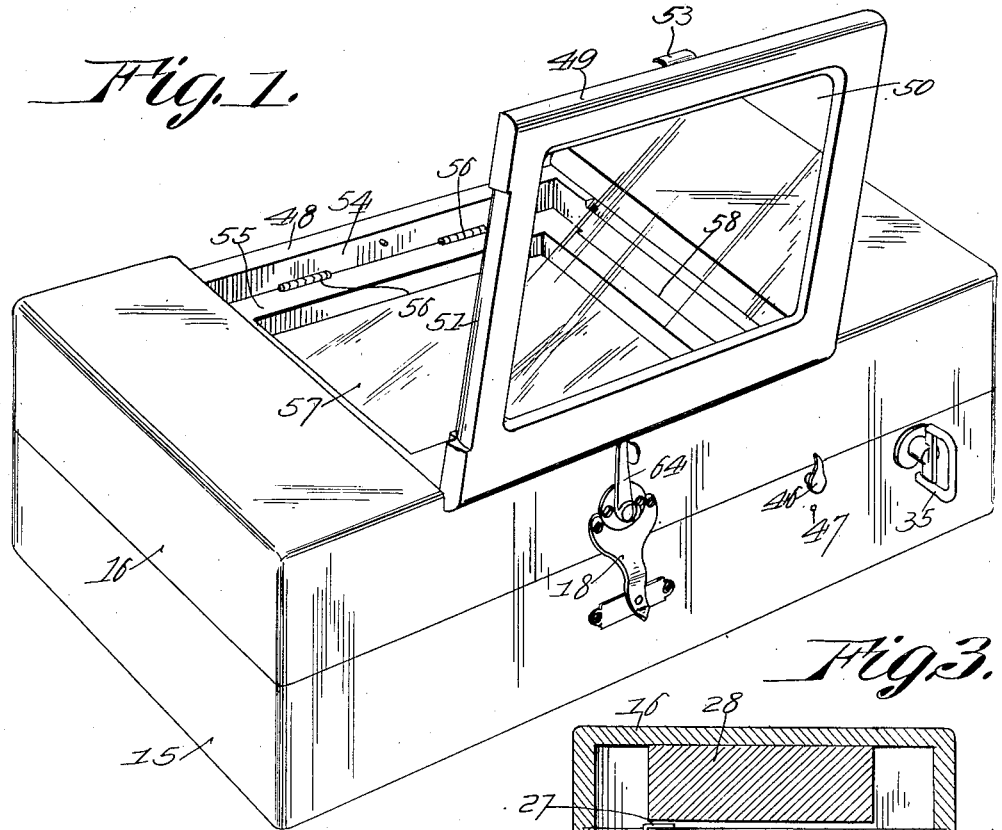
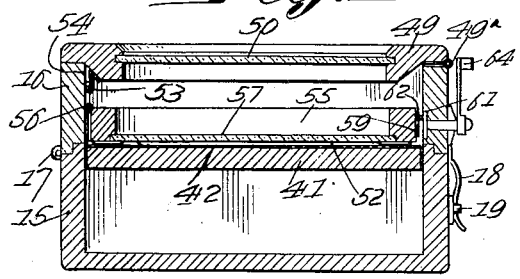
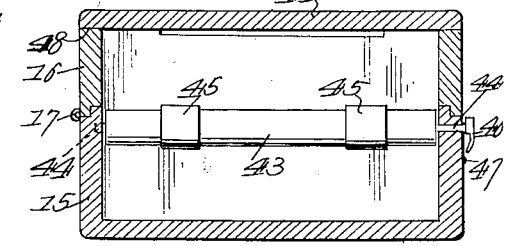
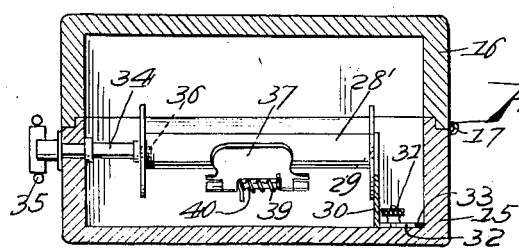
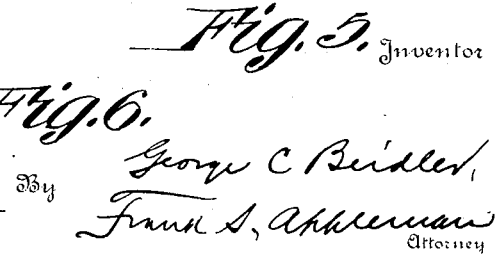
Inventor
George C Beidler,
By Frank S. Ackerman
Attorney G. C. BEIDLER.
PHOTOGRAPHIC PRINTING APPARATUS.
APPLICATION FILED APR. 10, 1917.
1,340,209.
Patented May 18, 1920.
2 SHEETS—SHEET 2.
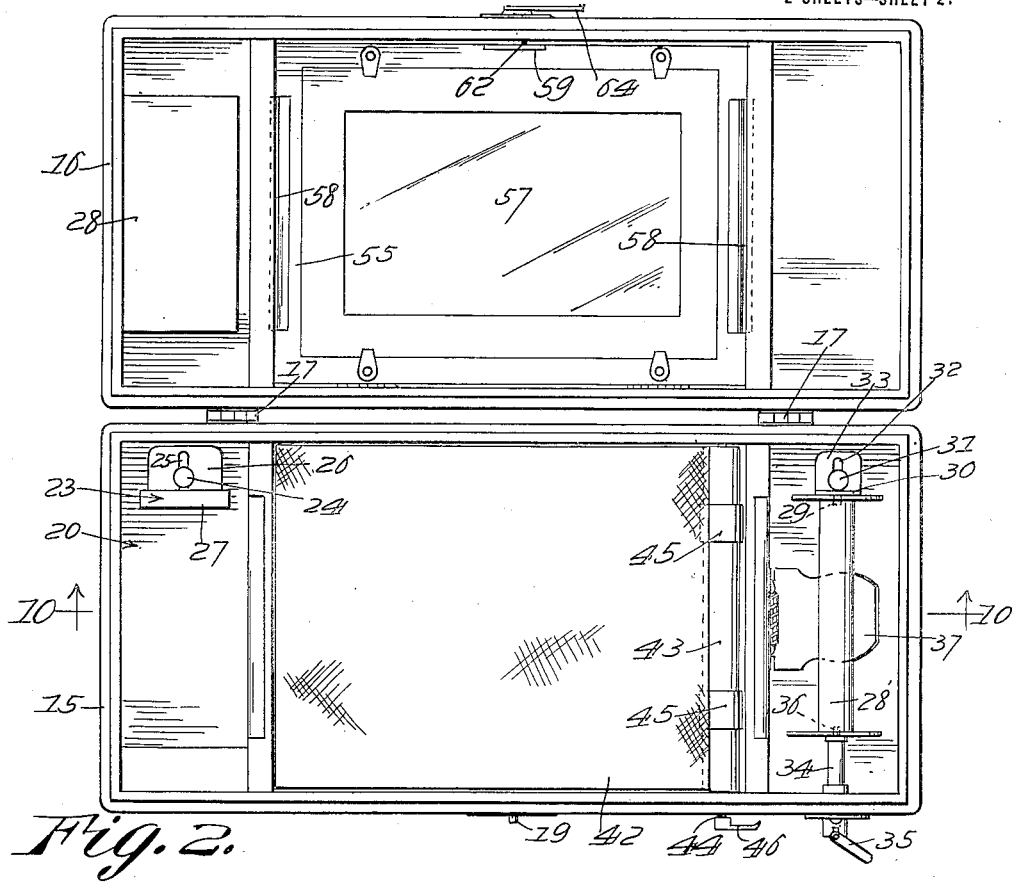
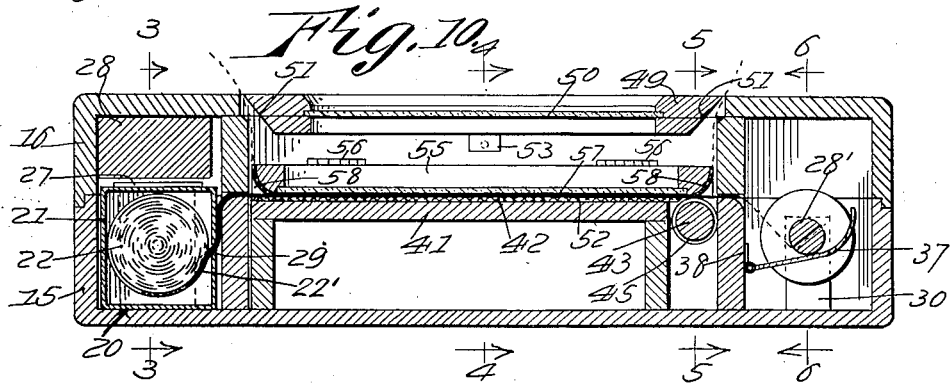
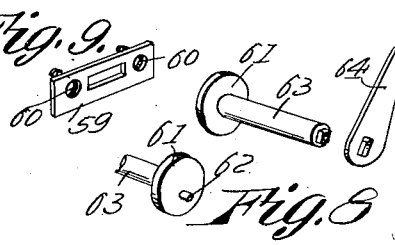
Inventor,
George C Beidler,
By Frank S. Appleman
Attorney

UNITED STATES PATENT OFFICE.

GEORGE C. BEIDLER, OF ROCHESTER, NEW YORK.

PHOTOGRAPHIC-PRINTING APPARATUS.

1,340,209.　　　　　Specification of Letters Patent.　　Patented May 18, 1920.

Application filed April 10, 1917. Serial No. 161,004.

*To all whom it may concern:*

Be it known that I, GEORGE C. BEIDLER, a citizen of the United States of America, and resident of Rochester, in the county of Monroe and State of New York, have invented certain new and useful Improvements in Photographic-Printing Apparatus, of which the following is a specification.

This invention relates to photographic printing and particularly to means for exposing photographic printing paper to light through a negative or the like, means being provided whereby the said paper may be protected from light or exposure except when the printing operation is being carried out.

A further object of this invention is to provide novel means for holding a supply of printing paper and for protecting the same from light while in the means for holding it, novel means being also provided associated with the printing paper whereby the said printing paper may be wound while, at the same time, it is protected from light after it is so wound.

While I have referred to the sensitized element as "printing paper" it is to be understood that I mean thereby any sensitized element which is to be exposed to light and afterward treated to develop an image or picture on the surface thereof, in accordance with the well known principles of photography.

A further object of this invention is to provide novel means for holding a film in contact with the sensitized element so that light may pass through the negative to the sensitized element without diffusing to an extent which will affect the image transferred to the sensitized element.

A further object of this invention is to provide an indicator actuated by the movement of the sensitized element so that an operator may determine by the indicator when a predetermined length of sensitized element has been wound or drawn through an exposing chamber or under an exposing frame of the printing device.

With the foregoing and other objects in view, the invention consists in the broad idea as well as in the details of construction to be set forth in the claims during the prosecution of the application, the said claims to be of such scope as to give protection commensurate with the inventive act in view of the state of the art when the said invention was produced.

In describing the invention in detail, reference will be had to the accompanying drawings forming part of this specification, wherein like characters denote corresponding parts in the several views, and in which—

Figure 1 illustrates a view in perspective of a printing device embodying the invention;

Fig. 2 illustrates a plan view of the same in open position;

Fig. 3 illustrates a sectional view on the line 3—3 of Fig. 10;

Fig. 4 illustrates a sectional view on the line 4—4 of Fig. 10;

Fig. 5 illustrates a sectional view on the line 5—5 of Fig. 10;

Fig. 6 illustrates a sectional view on the line 6—6 of Fig. 10;

Fig. 7 illustrates a perspective view of a printing frame operating means;

Fig. 8 illustrates a perspective view of a cam forming a part of the frame operating means;

Fig. 9 illustrates a perspective view of a slotted plate in conjunction with which the cam operates; and Fig. 10 illustrates a sectional view on a line corresponding with the line 10—10 of Fig. 2 with the cover closed.

In these drawings 15 denotes a box or casing having a cover 16, the said box and cover being hinged together by the hinges 17 and being held in closed position by a latch 18 which engages a stud 19.

At one end of the receptacle 15 is a compartment 20 adapted to receive a container such as a box 21 which holds sensitized material 22 which is coiled therein and preferably the sensitized material is accompanied by and has wrapped with it a protecting strip 22', said protecting strip being preferably of opaque material to prevent light from gaining access to the said sensitized material. This compartment is adapted to hold containers of different lengths and for the purpose of holding such containers against undue movement, a sliding abutment 23 is provided which is held in different positions of adjustment by a set screw 24 which operates in a slot 25 in the base 26 of said compartment. The abutment also has a flange 27 which will overlie the box or container to prevent undue movement of the same, or, if desired, a filling block 28 may be placed above the receptacle to prevent its dislodgment when the sensitized element is being drawn from it. The receptacle has a slot 29 through which the sensitized element and the protecting strip may be drawn, and if desired, packages of sensitized elements may be wrapped with the protecting strip in a manner which will permit a certain length of protecting strip to be drawn from the receptacle before the sensitized element appears. This arrangement is of particular importance in connection with the apparatus here shown, since it will permit the said protecting strip to be drawn through or beyond the exposing chamber of the printing device, and the end of the said exposing strip may be applied to a spool 28' on which it may be wound after the manner of films which are now wound on spools in the hand cameras having webs of film which are drawn from one spool to another.

In providing means for winding the protecting strip and the sensitized element, the slotted spool 28' is rotatably mounted on a stud 29 of the bracket 30, the said bracket being adjustable in the casing by reason of the set screw 31 which operates in a slot 32 in the base 33 of the said bracket.

The opposite end of the spool may be mounted on spindle 34 which is journaled in the side of the casing and an operating means such as the handle 35 may be provided on the spindle so that the spindle may be rotated, and the end of the spindle may have a spur or other spool engaging device 36 which will cause the spool to rotate with the said spindle. Any appropriate means may be provided for rotating the spool or for mounting it, so that it will rotate, and I do not wish, therefore, to be limited to the construction here shown.

As a means for exerting pressure or tension on the film and protecting strip as it is wound on the spool, a yieldable tension member 37 is hinged to a plate 38 and a spring 39, which has one end bearing against the tension member and the other end bearing against a wall of the casing or a partition thereof, serves to press the tension member into engagement with the material wound on the spool, it being shown in the drawing that the said spring encircles the pintle 40 on which the tension member is hinged.

A support or platform 41 is provided in the casing over which the sensitized element is drawn and against which the said sensitized element is pressed for insuring firm contact with the negative with the said sensitized element when the printing operation is carried on, and preferably, this platform or support has a yielding surface, such as felt 42 to produce a cushioning action when the clamping member is operated.

At or near the end of the platform or support, an indicating roller 43 is journaled and the shaft or projecting ends 44 of the roller are journaled in the sides of the casing. If desired, the roller 43 may have friction bands 45 of rubber or the like which is engaged by the sensitized element or the protecting strip thereof so as to rotate the roller as it is passing over it. One of the projecting ends 44 of the roller extends beyond one of the outer walls or surfaces of the casing and an indicating finger 46 is applied to it, which indicating finger moves in relation to a stud or pin 47 so that an operator may know or count the revolutions imparted to the roller and thereby determine the length of sensitized element which has passed over the said roller. In sensitized elements of given length, the indicator may pass the stud or pin a given number of times for indicating a certain length. As an example, it might be stated that a length of sensitized element which would have an area equal to the exposure opening (to be presently more particularly referred to) would, in its travel, return the roller and carry the indicator past the pin three times, but that would of course depend upon the diameter of the roller and any arbitrary arrangement with respect to this indicator may be adopted.

The cover 16 has a part of its top removed as shown at 48, the same being closed by a frame 49 hinged as at 49ª so that it will swing from a horizontal to a vertical position or to positions intermediate the same, the said frame having preferably a ruby glass 50 therein through which the interior may be observed without admitting actinic rays of light to the said interior. Each end of the frame is preferably provided with a beveled surface 51 which forms a clearance between the said frame and the top of the cover for the admission of developed film or negative which is to be used in the printing operation, it being possible to slide the negative or film from end to end in the exposing chamber 52 which is formed between the cover and the support for the sensitized element. The hinged frame 49 is held closed by a tension member 53 which bears against the inner surface 54 of the cover, although any appropriate means may be provided for holding the said frame in closed position.

Within the exposing chamber, a presser frame 55 is mounted on hinges 56, which hinges are secured to the said frame and to the side of the cover and the said frame 55 has a transparent glass 57 which is adapted to bear against a film to press it into intimate contact with the sensitized element used in the printing operation. The ends of the frame 55 are recessed as at 58 to form clearances for the passage of the negative or film and said negative or film may thereafter be slid with relation to the sensitized element or with relation to the exposing chamber and the proper area of negative or film may be brought into proper relation to the exposing chamber. For instance, a film that had a series of exposures thereon could be inserted through the slots or clearances at the ends of the frames 49 and 55 and the position of the exposed area of film could be observed through the glass 50. When the film had been properly adjusted and the clamping frame had been operated (as will presently appear) to press the film in intimate contact with the sensitized element, the frame 49 may be moved on its hinges to open the top or cover to admit light through the transparent glass 52 and through the negative to the sensitized element, this being an exposure which is employed in photographic printing. When exposure of predetermined interval had been made, the frame 49 would be closed, thus protecting the sensitized element from the rays of actinic light and after releasing the clamping frame, the said sensitized element would be wound on the spool to bring an unexposed area into the exposing chamber and the negative or film would likewise be moved if a new exposure were desired or if another print of the same picture were wanted the negative or film would be permitted to remain stationary and an exposure would be made as before.

The side of the frame 55 opposite the hinges 56 has a slotted plate 59 secured to it by fastenings 60 such as screws and a cam 61 has a lug 62 adapted to operate in the slot of the plate so that the frame would thereby be pressed into engagement with the negative or film.

As a means for operating the cam, a shaft 63 is journaled in the cover and the outer end of the shaft has a crank handle 64 applied to it so that as the crank handle is turned, the cam is rotated and the glass 52 of the frame is moved with relation to the negative or film, as and for the purpose stated.

This invention, it will be observed, provides for holding a sensitized element so that it may be moved to bring certain areas or sections within the exposing chamber, while at the same time excluding it from light except when it is to be exposed, and it also provides means whereby the negative may be conveniently applied and moved with relation to the exposing chamber to the sensitized element, these objects having been attained by the mechanism hereinbefore described, and it is thought that an understanding of the invention and its operation can be had from the foregoing description, and the advantages of having the sensitized element in film form so that it may be applied to the printing device while protected from light and in having the protecting strips on it in the same manner as protecting strips are now applied to film now in hand cameras, all contribute to a successful production of photographs in a simple and convenient way.

It will be apparent from the foregoing description that if the sensitized element is drawn through an exposing chamber and wound on the spool, the spool may be turned to draw the said sensitized element according to the length of sensitized element desired, and when the film or negative has been threaded through the slots at the ends of the frames, it may be moved so as to bring a certain area of the negative within the exposing chamber and the frame containing the ruby glass may be raised to admit light through the negative to the sensitized element after which the frame containing the ruby glass may be closed and the sensitized element may be manipulated and the operation may be repeated.

I claim:

1. In a photographic printing apparatus, a casing having an exposing chamber, a holder for a sensitized element and protecting strip, said holder having a slot therein for the removal of the said protecting strip and sensitized element, a support for the sensitized element, means for winding the sensitized element and protecting strip, and means for pressing a negative into engagement with the sensitized element, the said pressing means having clearances at its ends for the passage of the sensitized element or protecting strip.

2. In a photographic printing device, a casing having an exposing chamber with means for movably holding a negative therein, means for protecting the exposing chamber from actinic light, said means being movable to permit access of light for printing, means for moving the sensitized element with relation to the exposing chamber and the negative, means for clamping the negative and sensitized element together while exposed to light, and means exterior of the casing for operating the clamping member.

3. In a photographic printing device, a casing, an apertured cover therefor, a support for a sensitized element under said aperture, a transparent negative and sensitized element clamp coacting with said support, and means extending externally of the casing for operating the clamp, 4. In a photographic printing device, a casing having an exposing chamber with means for movably holding a negative therein, means for protecting the exposing chamber from actinic light, said means being movable to permit access of light for printing, means for moving the sensitized element with relation to the exposing chamber and the negative, means for clamping the negative and sensitized element together, a slotted plate on the clamping means, a cam operatable in the slot, and means for rotating the cam.

GEORGE C. BEIDLER.